Jan. 13, 1925

J. R. ROGERS 1,522,839

DEVICE FOR TRANSMITTING POWER

Filed July 25, 1918    4 Sheets-Sheet 1

Inventor

John R. Rogers

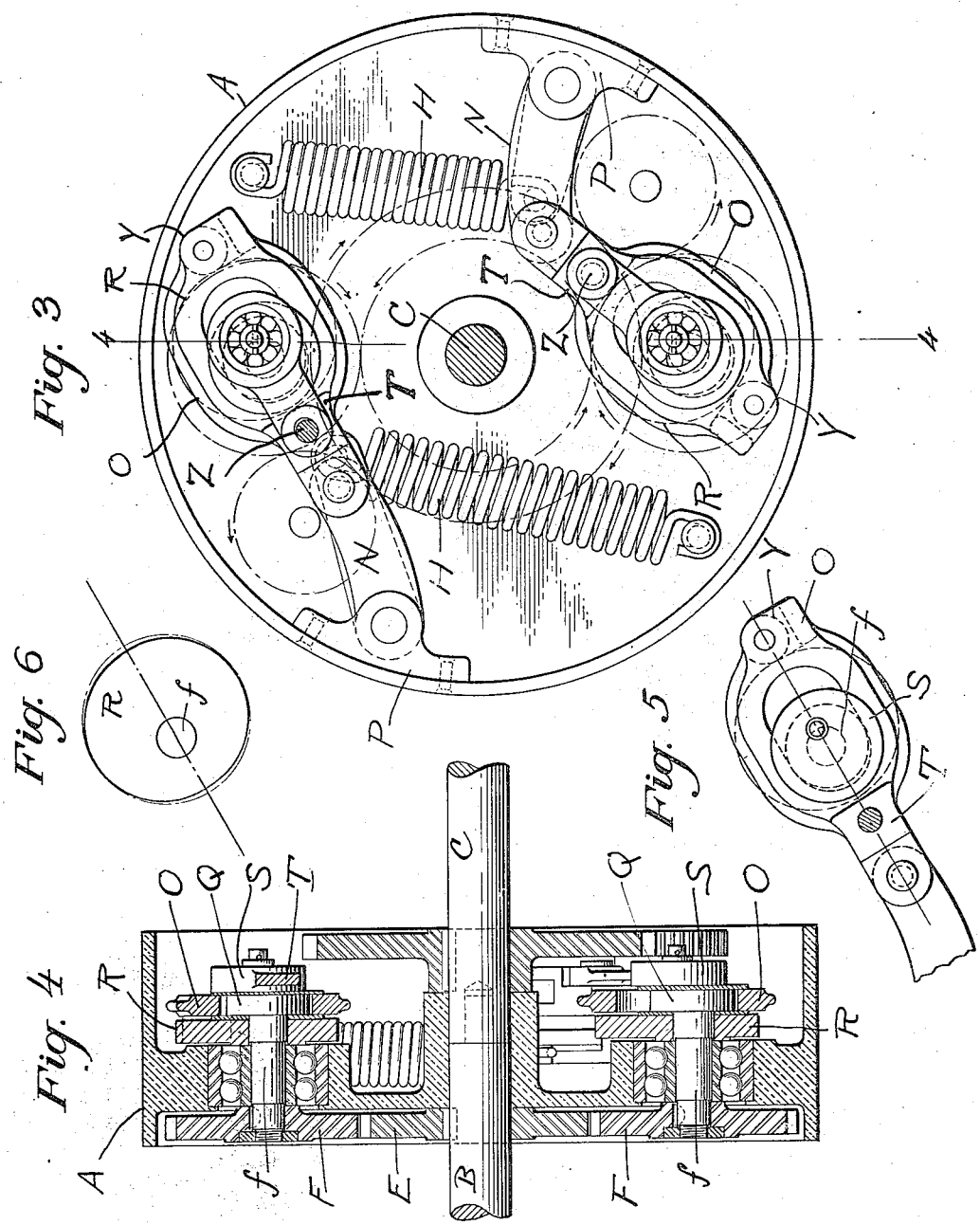

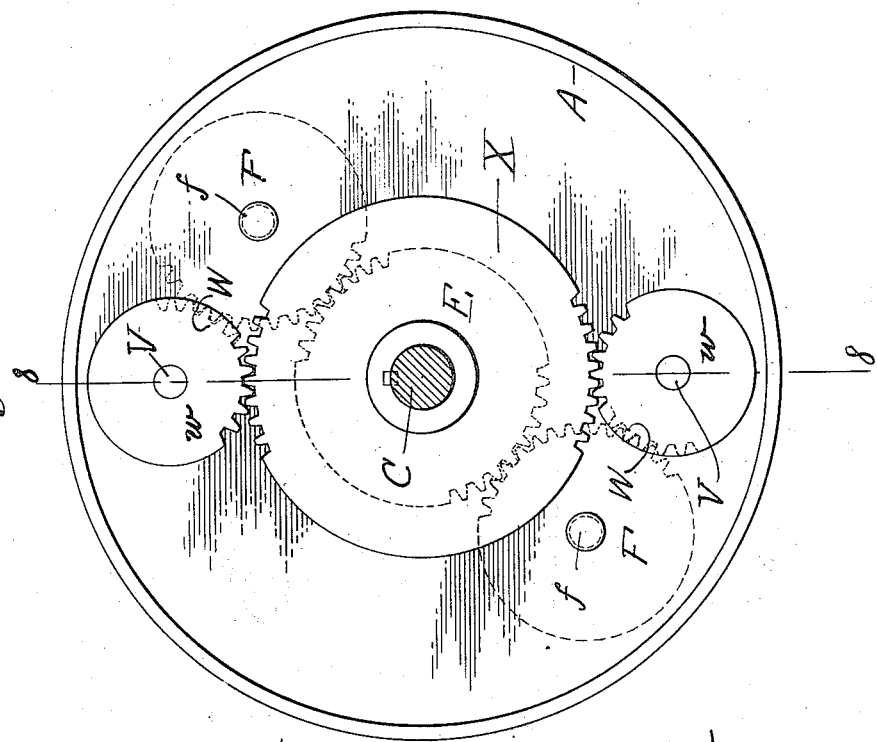
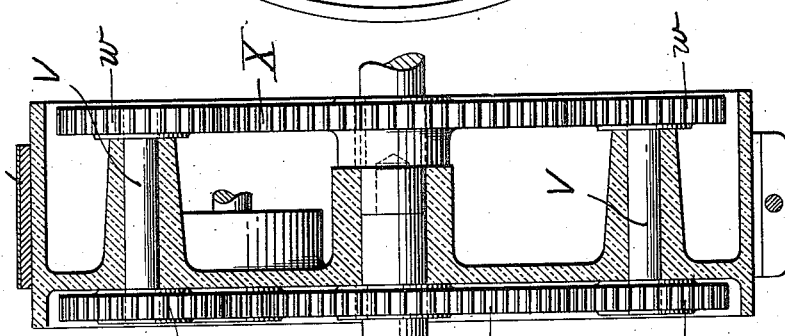
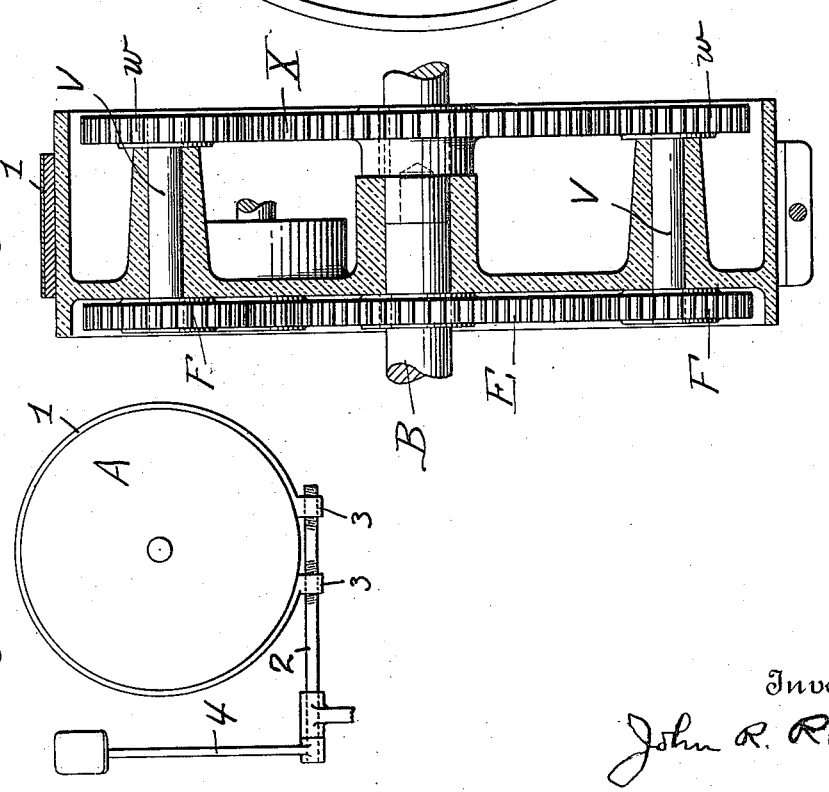

Jan. 13, 1925. 1,522,839

J. R. ROGERS

DEVICE FOR TRANSMITTING POWER

Filed July 25, 1918  4 Sheets-Sheet 4

INVENTOR

John R. Rogers

Patented Jan. 13, 1925.

1,522,839

UNITED STATES PATENT OFFICE.

JOHN R. ROGERS, OF BROOKLYN, NEW YORK.

DEVICE FOR TRANSMITTING POWER.

Application filed July 25, 1918. Serial No. 246,654.

*To all whom it may concern:*

Be it known that I, JOHN R. ROGERS, a citizen of the United States of America, and resident of the city of New York, borough of Brooklyn, county of Kings, State of New York, have invented certain new and useful Improvements in Devices for Transmitting Power, of which the following is a full, clear, and exact specification.

The object of my invention is to provide means for automatically increasing the torque on a driven shaft with corresponding reduction of speed of said shaft with reference to the driving shaft.

The devices hereinafter shown may be considered as improvements on my Patent No. 1,256,596 dated February 19, 1918 and my application Serial No. 89,304 filed April 6, 1916.

Fig. 3 is a plan view of another form of my device;

Fig. 4 is a section on line 4—4 of Fig. 3;

Fig. 5 is a detail of a link and cam device shown in Fig. 3;

Fig. 6 is a detail of the cam shown in Fig. 3;

Fig. 7 is a plan view of the epicyclic gearing as shown in Fig. 4;

Fig. 8 is a view partly in section on line 8—8 of Fig. 7 showing the epicyclic gearing; and Fig. 9 shows a device for securing reverse motion of the driven shaft through the epicyclic gearing shown in Figs. 7 and 8.

Similar letters of reference indicate similar parts throughout the several views.

Figure 1:
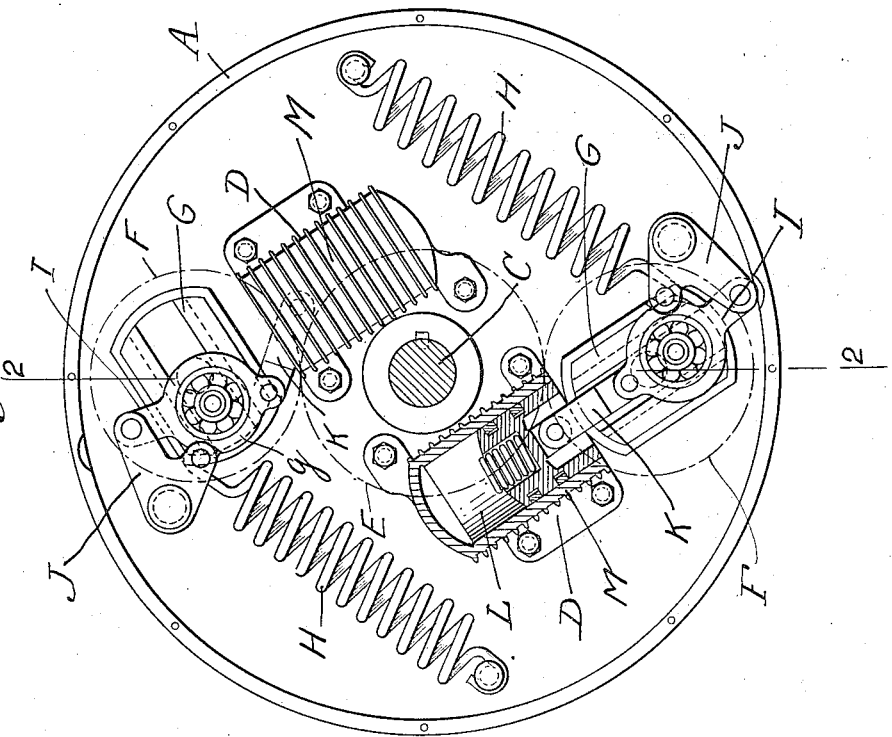
Fig. 1 is a plan view of one form of my device.
Figure 2:
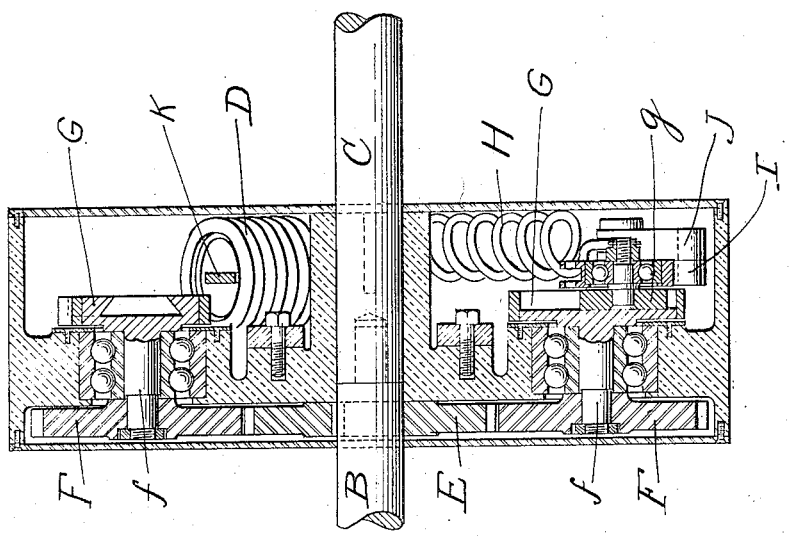
Fig. 2 is a section of Fig. 1 on line 2—2 of Fig. 1.

Referring now to Fig. 1, A is a drum or cylinder mounted on the driven shaft C and secured thereto by a suitable spline or pin. Mounted on the drum are springs H, H and dash-pots D,D the function of which will be hereinafter described. The driving shaft B is in line with the driven shaft C and loosely connected thereto. Mounted on the driving shaft B is the gear E which drives the gears F,F as shown in Fig. 2. The gears F,F are fast on shafts $f,f$, mounted in the drum A in ball-bearings and on the other ends of shafts $f,f$ from gears F,F are mounted bearings G,G for slides $g,g$. The slides $g,g$ are connected through the levers I,I and the bell cranks J,J, pivoted to the drum A, with the springs H,H. At the other end of the levers I,I the links K,K are connected to pistons L,L which move up and down in cylinder M,M. The link K and the piston L working in the cylinder M forms a dash-pot for taking up the force of the spring H when it is retracted.

When the driving shaft B on which is secured the gear E is revolved it will drive the gears F. The motion of these gears F is resisted by the springs H, which being attached to the drum tend to carry the drum around in the same direction as the revolution of the gear E, the drum A being fast on the driven shaft C as described. When the gear E is revolved the drum A will be carried around and the driven shaft C will also be revolved in the same direction and at the same speed so long as the resistance on the driven shaft C is less than the tension of the springs H. At this time the gear E and gears F,F are locked together and do not revolve with reference to one another.

When the resistance on the driven shaft C becomes greater than the tension of the springs H the gears F are revolved by the gear E, carrying around the bearings G and the slides $g$ mounted in these bearings. As the slides $g$ are carried around, through levers I and bell cranks J, they cause springs H to expand, putting thereby an increased pull on the drum A. When one of the slides $g$ reaches a position at right-angles to a dash-pot D, the tension of the springs H causes the slide $g$ to move forward in the bearing G carrying the piston L towards the bottom of the cylinder M. This action takes place through the link K. The piston as it moves forward compresses the air and forms a dash-pot in the ordinary manner so that the retraction of the spring H does not cause a pounding action or blow. The object of this device is to utilize the extension of the spring H to cause a pulling action on the drum A and to avoid a negative or reverse pull when the spring retracts.

It will be seen that when the tension of the springs H is greater than the resistance of the driven shaft C, the drum A and the driven shaft C will revolve at the same speed as the driving shaft B. When the resistance on the driven shaft C is greater than the tension on the springs H and the gears F revolve with relation to gear E as before described, the drum A and the driven shaft C revolve at a slower speed than the driving shaft B and the power of the driving shaft B is transmitted to the drum A through a succession of pulls or impulses by the springs H.

This makes a flexible or yielding connection between the driving shaft and the driven shaft and permits the driving shaft B to be revolved at a high speed putting a large number of impulses through the springs H upon the drum A, while the drum may revolve quite slowly as compared with the speed of the driving shaft.

In an automobile this permits the full power of the engine to be used with the driving shaft B revolving at a high speed while the driven shaft C is turning around at a much less speed than the driving shaft.

It will be noted that when the springs H are extended they put a torque on the drum A and that their retractive force is taken up by the dash-pots D so as not to retard the motion of the drum A.

I call this action of the springs H when being extended and pulling on the drum A, the "positive" action of said springs and the retractive action of the springs the "negative" action of said springs. It is one of the objects of this invention to make this negative action as slight as possible.

Fig. 3 shows another form for obtaining positive action of the springs H without negative action. In the form here shown the springs H are connected to toggle joints formed by the levers N and O. The lever N is pivoted at one end to a bracket P on the drum A. The other end of the lever N is pivoted to the lever O. The lever O is mounted upon a disc Q fast upon one end of the shaft f and has an endwise and slight rocking movement upon the disk Q. Also fixed upon the shaft f is a cam R and an eccentric S. This eccentric operates a link T which is connected with the lever O in such a manner that when the shaft f is revolved the eccentric S acting through the link T causes the lever O to have an endwise and slight rocking motion. This endwise motion of the lever O straightens out the toggle joint formed by the levers N and O.

The springs H tend to resist the straightening of the toggle joint formed by the levers N and O.

It will be seen that while the gears F are not revolving, if said gears F are connected to the driving gear E they will exert a pull through the springs H tending to revolve the drum A in a manner exactly similar to that heretofore described.

In this form of my device I do not connect the gears F to the driven shaft C directly through springs H but arrange gears F to drive gears W on shafts V, said shafts V carrying at their other ends gears w driving a large gear X fast upon the driven shaft as shown in Figs. 7 and 8.

It will be seen that when the driving shaft B is revolved, it will through the gears F, the shafts f, the eccentrics S and the links T tend to straighten out the toggle joints which extend the springs H, thereby putting a pull upon the drum A and tending to cause it to revolve with the driving shaft B and at the same speed. When the resistance on the driven shaft C is greater than the tension of the springs H the springs will expand and contract and the drum A will revolve at a different speed from that of the driven shaft C.

In this device the drum A is mounted loosely upon the driving and driven shafts. When the resistance of the driven shaft C is great enough to overcome the tension of the springs H an epicylic action takes place as follows: Gear E drives gears F overcoming the resistance of the springs H and the drum A is carried around the shafts B and C through the gears w, w working upon the large gear X. The resistance of the springs H will be transmitted as driving power to the gear X in proportion to the relative number of teeth in the gears E and X. In the machine which I have constructed I have used 33 teeth in the gear E and 48 teeth in the gear X. When the drum A makes one full revolution while the gear E also makes one revolution, the gear X is carried forward by the number of teeth forming the difference between the teeth on gears E and X which in this case is 15. Gear X is therefore carried forward 15 teeth or a little less than one-third of a revolution. The ratio of torque at this time between the driving shaft B and the driven shaft C is that of 15 to 48, friction of the gears being neglected.

It has been found by experience that when this epicylic action takes place the resistance of the springs H will cause the gear X to revolve in exact proportion to the resistance upon the driven shaft C, or in other words, when the resistance of the driven shaft C is 48 to 15 the corresponding gain in torque by the driving shaft is 3 and 3/15. If the resistance is less than the ratio of 48 to 15 the action of the drum A is transmitted to the gear X both through the revolving of the gears and the action of the drum tending to make the driven shaft C to revolve at the same speed as the driving shaft B, hence there is an automatic adjustment or torque between the driving shaft B and the driven shaft C so that the driven shaft C will revolve as rapidly as the power transmitted through the driving shaft B and the increased torque on the driven shaft C can make it go.

In the device just described I overcome the negative motion (above defined) of the springs H in the following manner: When the springs H are about to retract, a roller Y mounted on the lever O comes into contact with the cam R which is mounted upon the shaft f as before described. The link T pulls upon the lever O through the pin Z. The hole in the link T surrounding the pin Z is slightly enlarged so that when the roller Y comes in contact with the cam R, the pull of the springs H is taken up by the roller Y and the cam R. It will be seen that as the link T moves forward, on account of the enlargement of the hole around the pin Z above described, the link will not push upon the lever O. The strain of the springs H upon the roller Y and upon the cam R is so nearly radial that there is almost no tendency to make the cam R revolve and in this way I avoid what I have defined as negative motion. This is another way of accomplishing what was done by the dash-pots in the other form of the device as above described in connection with Figs. 1 and 2.

While I have not shown the epicyclic gearing in Figs. 1 and 2, it is obvious that the said gearing could be used in connection with the driving gear E and the driven shaft C. The only difference in such case being that I overcome the negative motion in one instance by the use of a dash-pot and in the other case by the use of a cam and link as described.

In general the object of my device is to connect a driving shaft with a driven shaft through gearing or its equivalent; to resist the action of the gears by the means of springs or their equivalent; and to mount the gearing and springs upon a member, which in this case I have called a drum, whereby there may be an automatic adjustment between the resistance of the driven shaft and the power of the driving shaft, and in particular to overcome as far as possible the negative motion of the springs or their equivalents, so that the entire power applied to the driving shaft may be transmitted to the driven shaft.

Fig. 9 illustrates a device for obtaining reverse motion of the driven shaft C without the interposition of sliding gears. In Fig. 9, 1 is a brake band of ordinary construction operated through the shaft 2 having a right and lefthand thread of the usual construction working in lugs 3 of the brake band. The shaft 2 may be operated by either hand or foot. I have shown a foot lever 4. When the foot lever 4 is depressed the brake band tightens upon and stops the motion of the drum A and the epicyclic gearing acting upon the gear X as shown in Fig. 8, will cause the driven shaft C to revolve in the opposite direction from its normal motion. When the brake band 1 is released the drum A will be permitted to revolve, driving the gear X in its normal direction, which is the same as the direction of the driving shaft B.

While I have shown a yielding connection between the driving shaft and the driven shaft in the form of a spring, I wish it clearly understood that I do not confine myself to this form of a yielding connection.

Figure 10:
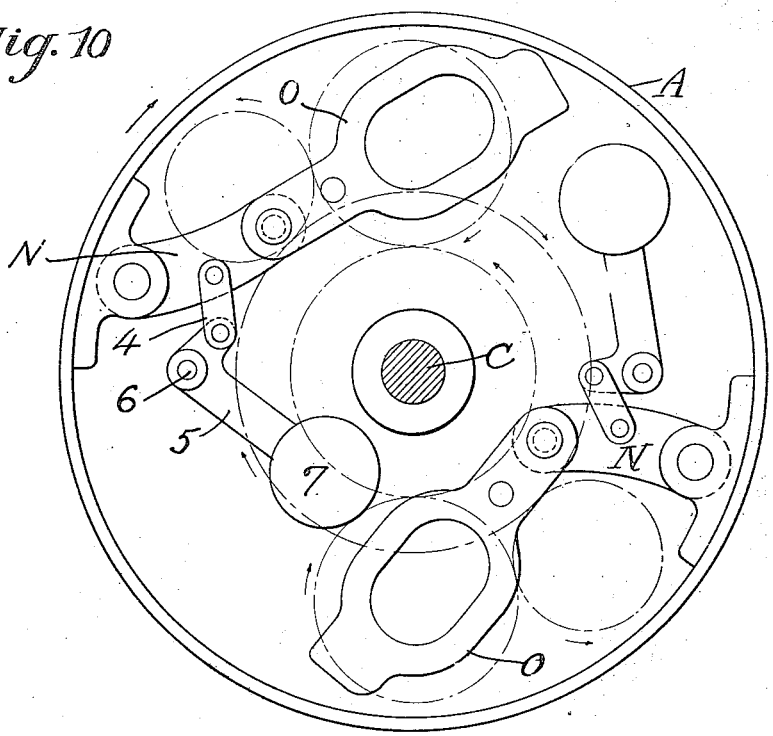
Fig. 10 shows another form for the yielding connection hereinafter mentioned by the use of centrifugal force instead of a spring.

Fig. 10 shows a device in which I use centrifugal force to obtain this yielding connection instead of a spring.

Fig. 10 corresponds to Figs. 3 and 4, the toggle joints, cams, etc. may be exactly the same as those shown in Figs. 3 and 4, and I have indicated these in outline only.

Instead of a spring attached to the lever M I attach a link 4 and lever 5 thereto, said lever 5 revolving on a pivot 6 and having at the outer end of the lever a weight 7. When the disc A is revolving the weight 7 will tend to depart from the driven shaft C and swinging around the pivot 6 through the link 4 will resist the straightening of the toggle joint formed by the levers N and O in the same manner as is done by the spring H in Fig. 3. When the resistance on the driven shaft is greater than the centrifugal force of the weight 7, the toggle joint will be straightened and the weight 7 pulled back towards the driven shaft C. When through the action of the gears the toggle joint is bent the weight 7 is allowed to swing outward from the driven shaft C. The swinging motion of the weight 7 corresponds to the expansion and contraction of the spring H in Fig. 3. When the weight 7 is thrown outwardly its action upon the lever N is taken up through the roll and cam in a manner exactly similar to that shown in Fig. 3. In this manner through the centrifugal force of the weight 7 I get a yielding connection between the driven shaft C and the driving shaft.

Figure 11:
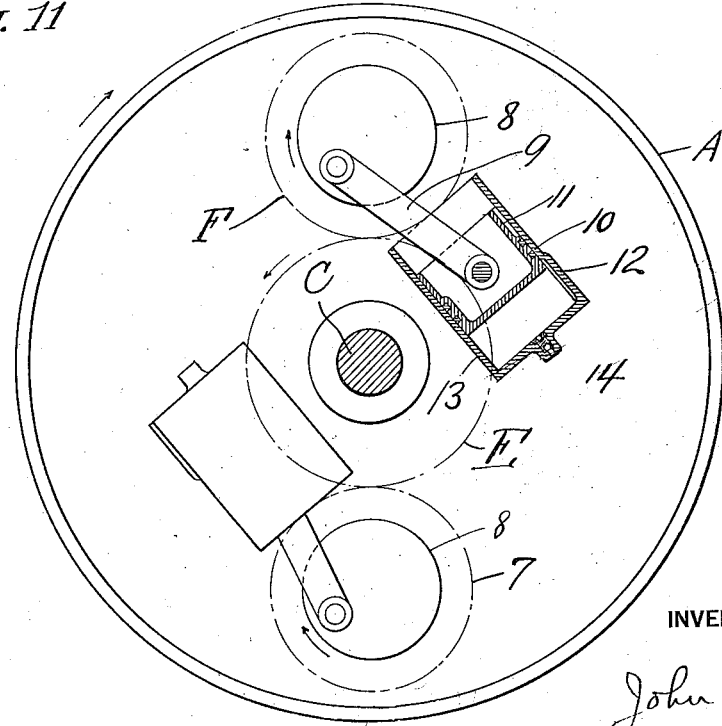
Fig. 11 is a view showing still another means for a yielding connection hereinafter mentioned by the use of a piston and compressed air instead of a spring.

Fig. 11 shows another form of obtaining the same yielding connection between the driving shaft and driven shaft as is shown in Fig. 1. In Fig. 11, C is the driving shaft. E is a gear thereon driving the gears F. Attached to these gears F are discs 8 having connecting rods 9 driving a piston 10 in cylinder 13. The cylinder 13 is attached to the disc A in a manner exactly similar to the cylinder M as shown in Fig. 1. At the bottom of the cylinder 13 is a check valve 14. In the side of the piston 11 is a groove occupying only a small portion of the circumference of the piston. In the cylinder 13 is another groove 12 corresponding to and registering with the groove 11 when the piston is at its lowest position.

It will be seen that when the disc 8 revolves in the direction of the arrow it will cause the piston 10 to descend in the cylinder 13 compressing the air in front of it. When the resistance of the driven shaft is less than the resistance caused by the compression of the air, the disc A will revolve in unison with the driving shaft B. When the resistance of the driven shaft is greater than the resistance of the compressed air in the cylinder 13 the piston 10 will descend in the cylinder 13 until the groove 12 registers with the groove 11 when the air will escape. In this case the disc A will revolve at its lower speed than the driving shaft B and the disc A will be driven forward by a series of impulses through the compression of the air in the cylinders 13, instead of a series of impulses through the action of the spring H as shown in Fig. 1.

I believe myself to be the first one to provide a yielding connection between the driving and the driven shaft in combination with means whereby the action of the driving shaft is made effective in one direction only, and I do not confine myself to any particular means of obtaining such result. I have shown and described three forms, namely a spring, a weight working by centrifugal force, and the compression of air in a cylinder. Other methods may suggest themselves to the skilled mechanic without departing from the spirit of my invention.

While I have described this device as applied to an automobile, I do not limit myself to such use, as wherever an automatic adjustment between the power of the driving shaft and the torque of the driven shaft is required, such device would be of value.

Having described my invention, what I claim is:

1. In a device for transmitting power the combination of a driving shaft, a driven shaft, a planetary gear, a yielding connection, gearing connecting the driving and driven shafts through said yielding connection and means for causing said yielding connection to exert its influence on one-half of the revolution only of the planetary gear.

2. In a device for transmitting power the combination of a driving shaft, a driven shaft, a planetary gear, a yielding connection, epicyclic gearing connecting the driving and driven shafts through said yielding connection and means for causing said yielding connection to exert its influence on one-half of the revolution only of the planetary gear.

3. In a device for transmitting power the combination of a driving shaft, a driven shaft, a yielding connection, epicyclic gearing connecting the driving and driven shafts through said yielding connection, means for causing effective action of said yielding connection in one direction only, and means for reversing the direction of the driven shaft through said epicyclic gearing.

4. In a device for transmitting power a planetary gear, a driving shaft, a gear mounted thereon, a driven shaft, a member mounted thereon, a gear on said member in mesh with the gear on the driving shaft and yielding means connecting said member and the gear mounted thereon, said yielding means being adapted to exert its influence on one-half of the revolution only, of the planetary gear.

5. In a device for transmitting power a driving shaft, a gear mounted thereon, a driven shaft, a member mounted thereon, a gear on said member in mesh with the gear on the driving shaft, yielding means connecting said member and the gear mounted thereon and means for causing said yielding means to exert its influence on one-half of the revolution only.

6. In a device for transmitting power the combination of a driving shaft, a driven shaft, a yielding connection, epicyclic gearing connecting the driving and driven shafts through said yielding connection, means for reversing the direction of the driven shaft through said epicyclic gearing and means for causing effective action of said yielding connection in one direction only.

7. In a device for transmitting power the combination of a driving shaft, a driven shaft, epicyclic gearing connecting the driving and driven shafts, a toggle joint, a spring connected thereto adapted to resist the movement of the toggle joint in one direction, a shaft driven by the epicyclic gearing and means carried by said shaft in operative relation to said toggle joint adapted to resist the end thrust of the toggle joint when the spring is retracted.

8. In a device for transmitting power the combination of a driving shaft, a driven shaft, epicyclic gearing connecting the driving and driven shafts, a toggle joint, a spring connected thereto adapted to resist the movement of the toggle joint in one direction, a link pivoted to one arm of the toggle joint, a shaft driven by the epicyclic gearing and means carried by said shaft in operative relation to said link and toggle joint adapted to resist the end thrust of the toggle joint when the spring is retracted.

9. In a device for transmitting power the combination of a driving shaft, a driven shaft, epicyclic gearing connecting the driving and driven shafts, a toggle joint, a spring connected thereto adapted to resist the movement of the toggle joint in one direction, a shaft driven by the epicyclic gearing and a cam carried by said shaft in operative relation to said toggle joint adapted to resist the end thrust of the toggle joint when the spring is retracted.

10. In a device for transmitting power the combination of a driving shaft, a driven shaft, epicyclic gearing connecting the driving and driven shafts, a toggle joint, a spring connected thereto adapted to resist the movement of the toggle joint in one direction, a link pivoted to one arm of the toggle joint, a shaft driven by the epicyclic gearing, an eccentric mounted on said shaft in operative relation to the link and a cam carried by said shaft in operative relation to said toggle joint adapted to resist the end thrust of the toggle joint when the spring is retracted.

11. In a device for transmitting power the combination of a driving shaft, a driven shaft, epicyclic gearing connecting the driving and driven shafts, a toggle joint, a spring connected thereto adapted to resist the movement of the toggle joint in one direction, a link pivoted at one end to one arm of the toggle joint, a shaft driven by the epicyclic gearing, an eccentric mounted on said shaft in operative relation to the link, a roller carried by the toggle joint and a cam on the shaft against which the roller is adapted to press radially of the shaft when the spring is retracted.

In testimony whereof I have signed this specification.

JOHN R. ROGERS.